Sept. 22, 1953      A. W. SKINNER      2,652,783

CROSSOVER BRIDGE AND OPERATING MECHANISM

Filed June 2, 1949      9 Sheets—Sheet 1

INVENTOR.
Asa W. Skinner
BY

ATTORNEY

Sept. 22, 1953      A. W. SKINNER      2,652,783
CROSSOVER BRIDGE AND OPERATING MECHANISM
Filed June 2, 1949      9 Sheets-Sheet 3

INVENTOR.
Asa W. Skinner
BY
ATTORNEY

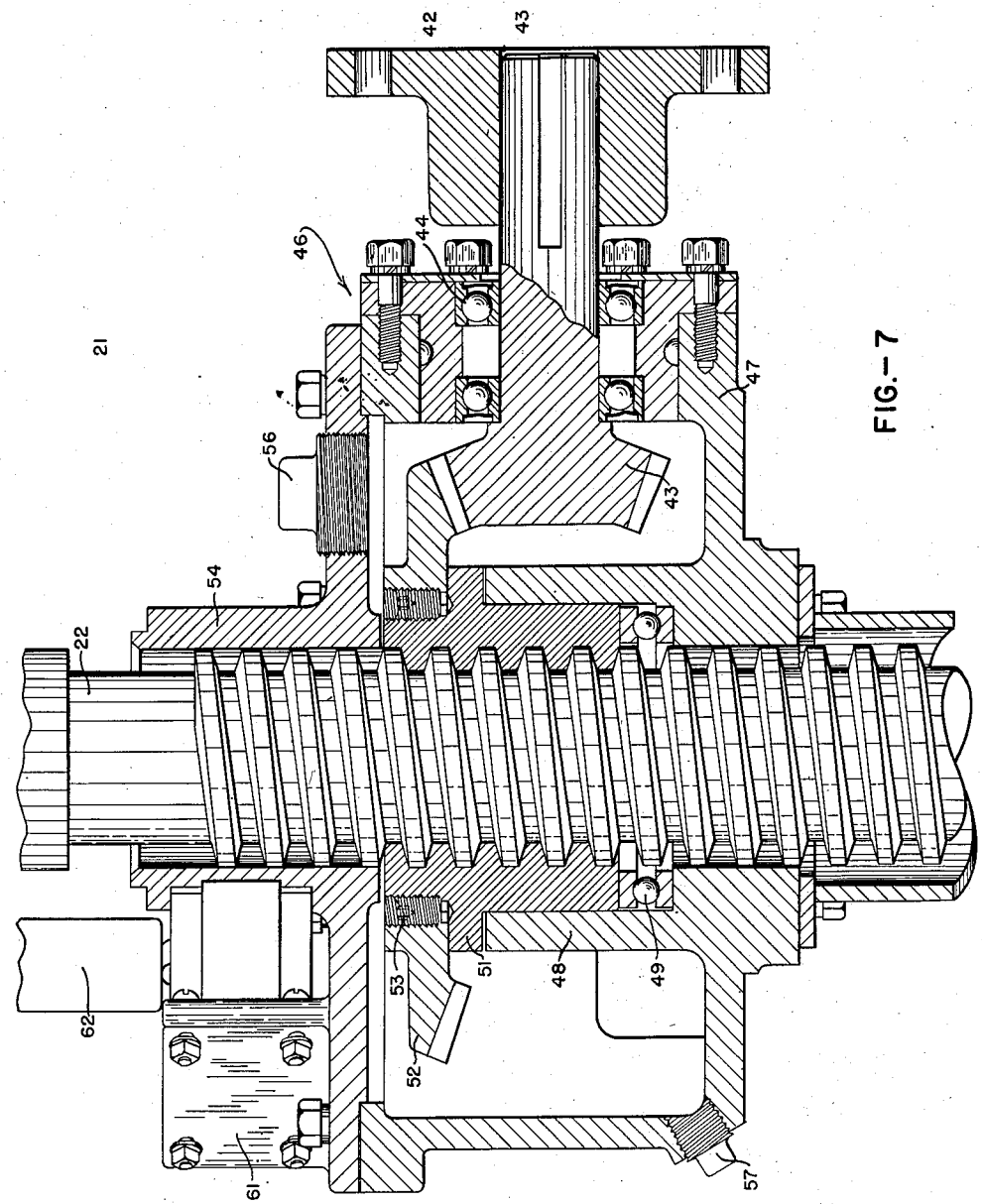
FIG.—7

Sept. 22, 1953     A. W. SKINNER     2,652,783
CROSSOVER BRIDGE AND OPERATING MECHANISM
Filed June 2, 1949     9 Sheets—Sheet 7
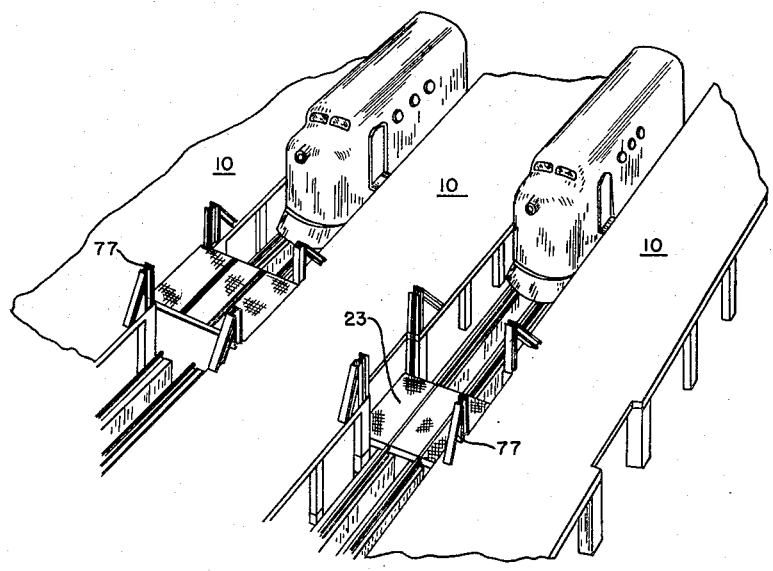
FIG.-15
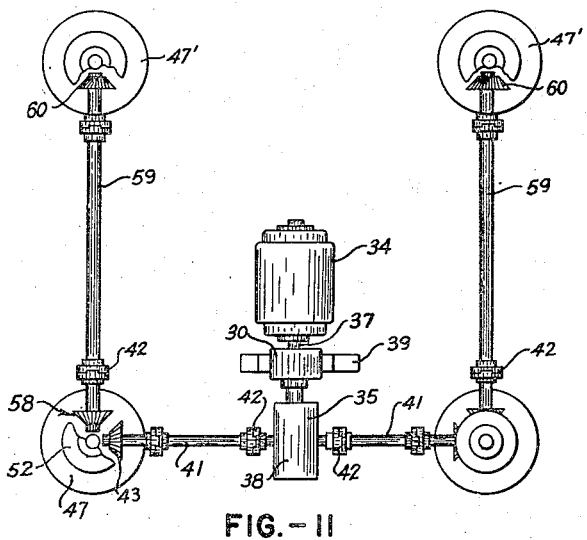
FIG.-11
INVENTOR.
Asa W. Skinner
BY
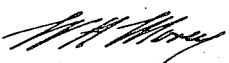
ATTORNEY Sept. 22, 1953 A. W. SKINNER 2,652,783
CROSSOVER BRIDGE AND OPERATING MECHANISM
Filed June 2, 1949 9 Sheets-Sheet 9

*INVENTOR.*
Asa W. Skinner
BY

Patented Sept. 22, 1953

2,652,783

UNITED STATES PATENT OFFICE 2,652,783

CROSSOVER BRIDGE AND OPERATING MECHANISM

Asa W. Skinner, Riverdale, Ill., assignor to Whiting Corporation, Harvey, Ill., a corporation of Illinois Application June 2, 1949, Serial No. 96,783

14 Claims. (Cl. 104—31)

My invention is directed to crossover bridges, particularly of the type adapted to be raised and lowered and thereby bridge openings which interfere with the passage of men and materials.

For the purposes of illustration, I shall describe my invention as applied to a diesel locomotive repair shop where it is particularly useful, but it should be understood that my bridge is adaptable for other uses. Diesel locomotive repair shops are frequently constructed with spaced parallel piers rising above the ground floor to support the railway track upon which the locomotive moves. On either side of the tracks are decks elevated above the ground floor and above the tracks a distance sufficient to place them in the same plane as the floor of the locomotive. The decks therefore define elongated bays in which the tracks run and in which the locomotive or other vehicle is positioned for service. While this type of building arrangement is highly efficient in many respects, it seriously impedes the efficient transfer of men and materials in a direction transverse to or across the bays, since the elevated tracks with their piers normally block passage on the ground level and the bays themselves constitute an obstacle at deck level.

While a principal object of my invention is to provide a bridge together with suitable operating mechanism for raising and lowering the bridge to span gaps and interruptions at different levels, another important object includes the provision of a crossover bridge which in lowered position provides a passage for a heavy vehicle at a predetermined level, and when raised permits passage in a transverse direction at a different level.

Other primary objects of my invention include the provision of a crossover bridge which is particularly adapted for use in diesel locomotive repair shops for providing passage in one direction for a locomotive at track level and, when moved to another position, for providing transverse passage for men and materials at other levels, and which is coordinated with the building structure to prevent accidental displacement or undue strain upon the bridge-operating mechanism or the support members.

Further important objects of my invention will be found in the various novel components employed, and in various combinations and arrangements of such components as will be disclosed in the following detailed description, and in the appended drawings, in which:

Fig. 7 is a partial cross section through a portion of the operating mechanism of my bridge;

Fig. 11 is a plan view of the drive mechanism for my bridge;

Fig. 15 is a perspective view showing a modified form of my bridge in operation.

In brief, my bridge is intended for use over a pit which houses the bridge-operating mechanism and which is disposed, for example, in an interruption in rail-supporting piers disposed between elevated decks. The bridge includes a platform having flush-mounted rail sections fixed thereto for alignment with a railway track and a floor plate level with the rail surfaces. Threaded support members are fixed to the under side of the platform and engage rotatable nuts disposed in the pit. The nuts are connected through a worm gear mechanism to a suitable reversible electric motor having a solenoid type spring-actuated brake. When it is necessary to move a locomotive or the like along the tracks, the bridge is lowered by operation of the motor until the platform engages abutments fixed to the ends of the rail-supporting piers. These abutments engage the platform and fix its position both vertically and laterally in such manner that displacement of the platform under the weight or tractive effort of a locomotive is virtually impossible. When the locomotive has passed the platform may be raised to deck level, thus spanning the bay and exposing a plate covering the pit at ground floor level, which also forms a passageway across the tracks.

Figure 1:
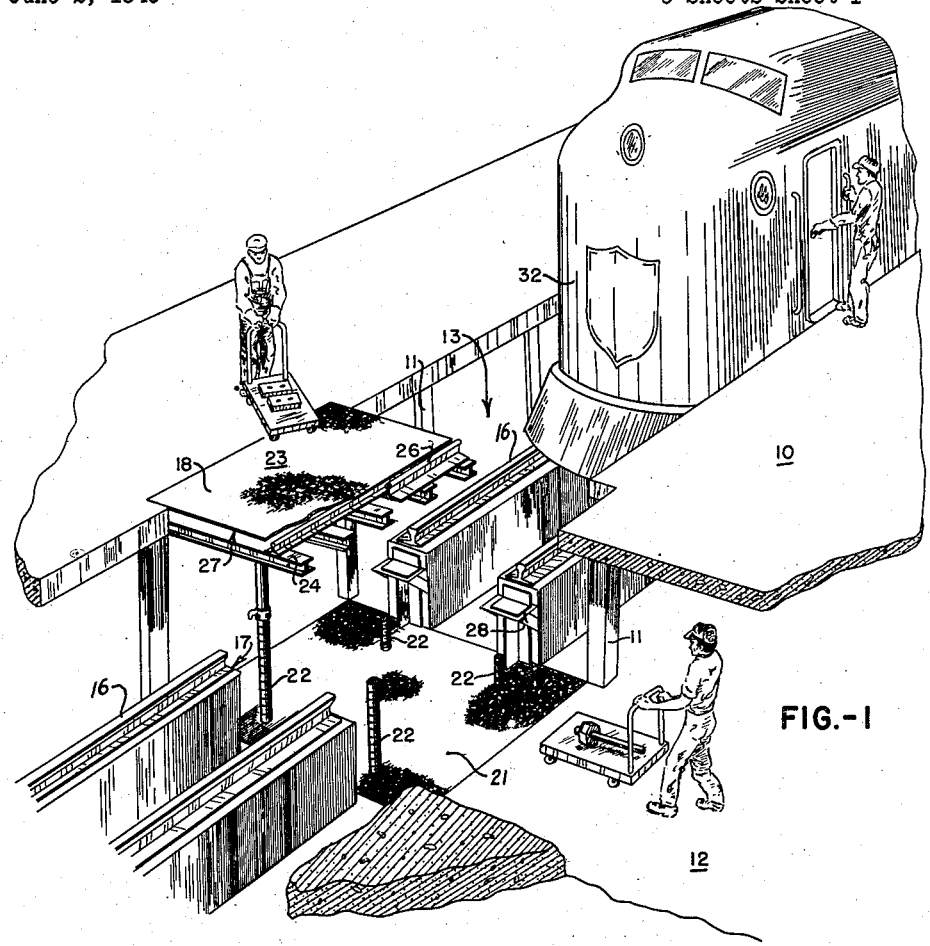
Fig. 1 is a partially broken away perspective indicating the general arrangement of my bridge.
Figure 2:
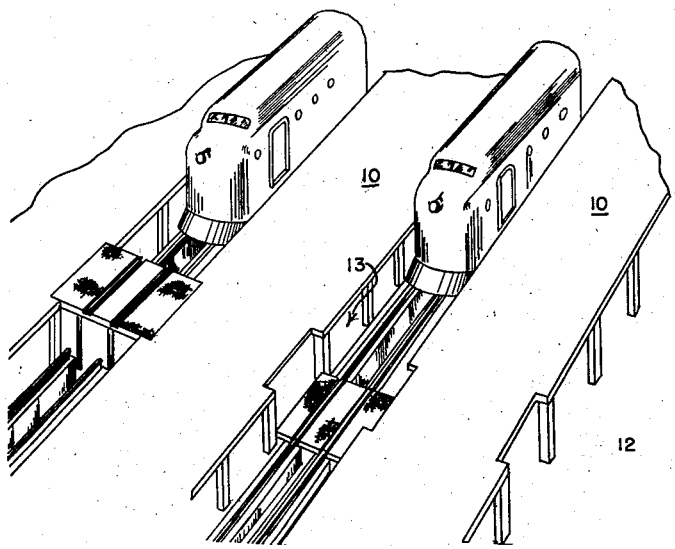
Fig. 2 is a perspective indicating the relationship of my bridge to building structure.
Figure 3:
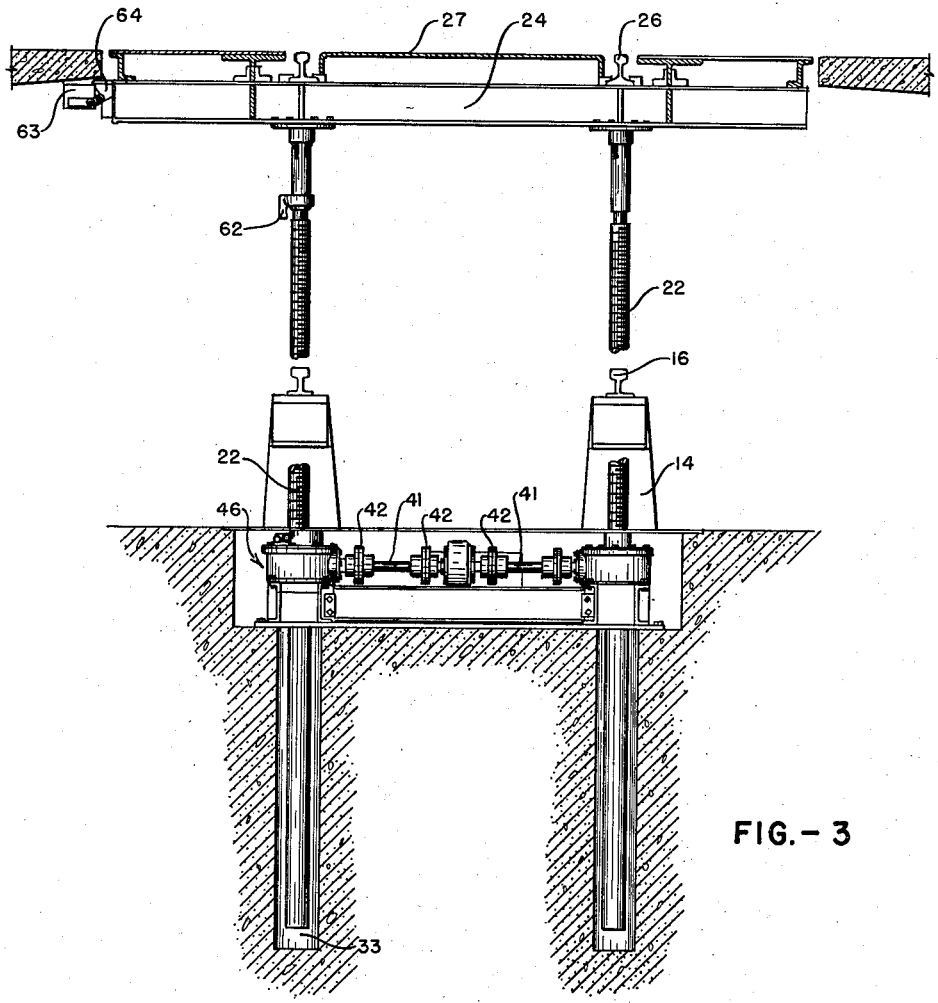
Fig. 3 is an end elevation of my bridge.
Figure 8:
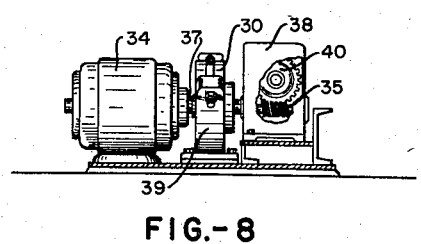
Fig. 8 is a side elevation of a suitable driving mechanism for my bridge.

The general arrangement of my device is best shown in Figs. 1 and 2 wherein I have illustrated a portion of a diesel locomotive repair shop including spaced, generally parallel, longitudinally extending decks 10 supported by pillars 11 above a ground floor 12 at approximately locomotive floor level. In a bay 13, defined by the spaced decks 10, are elevated piers 14 upon which railway rails 16 are mounted defining a railway track. This type of structure is desirable since the use of elevated railway tracks provides sufficient head room for men working on the ground floor 12 below the decks 10. The piers 14 and tracks 16 are interrupted, as at 17, for the installation of my bridge, generally designated 18.

Figure 4:
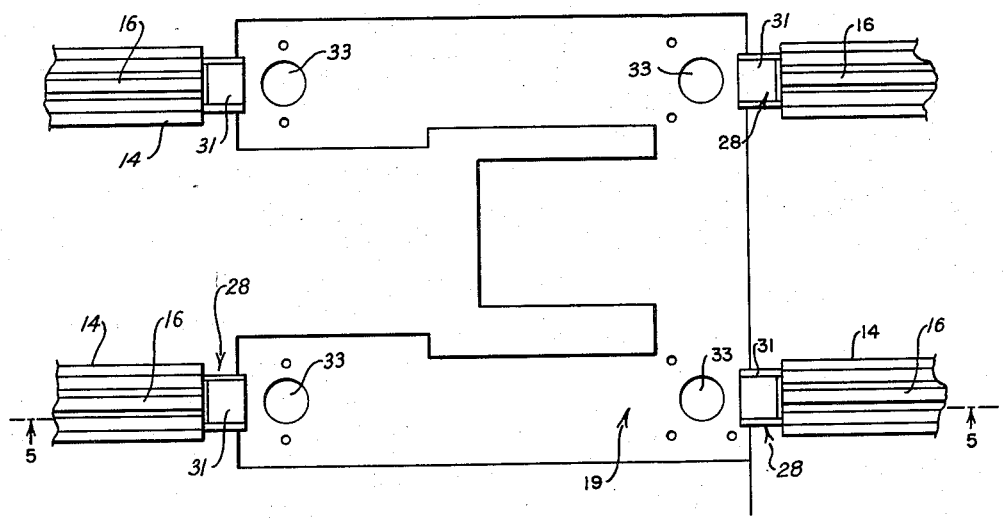
Fig. 4 is a plan view of the building structure adapted to receive my bridge.
Figure 5:
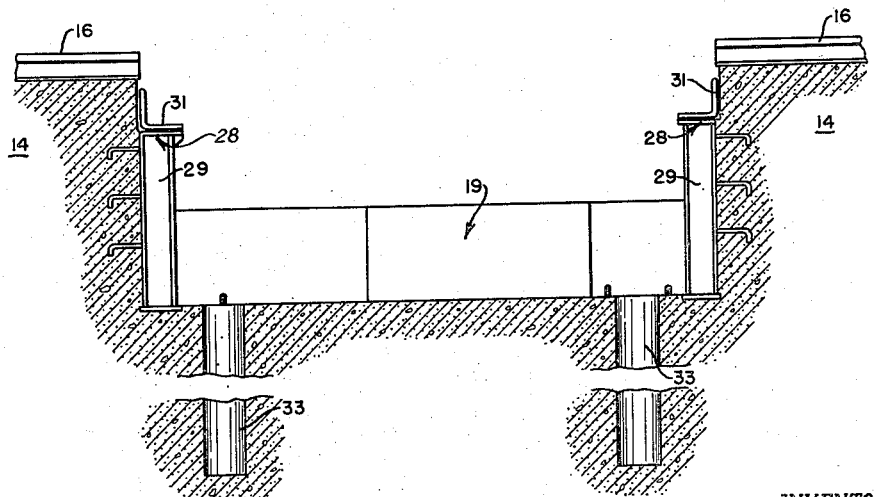
Fig. 5 is an elevation of the structure shown in Fig. 4.
Figure 6:
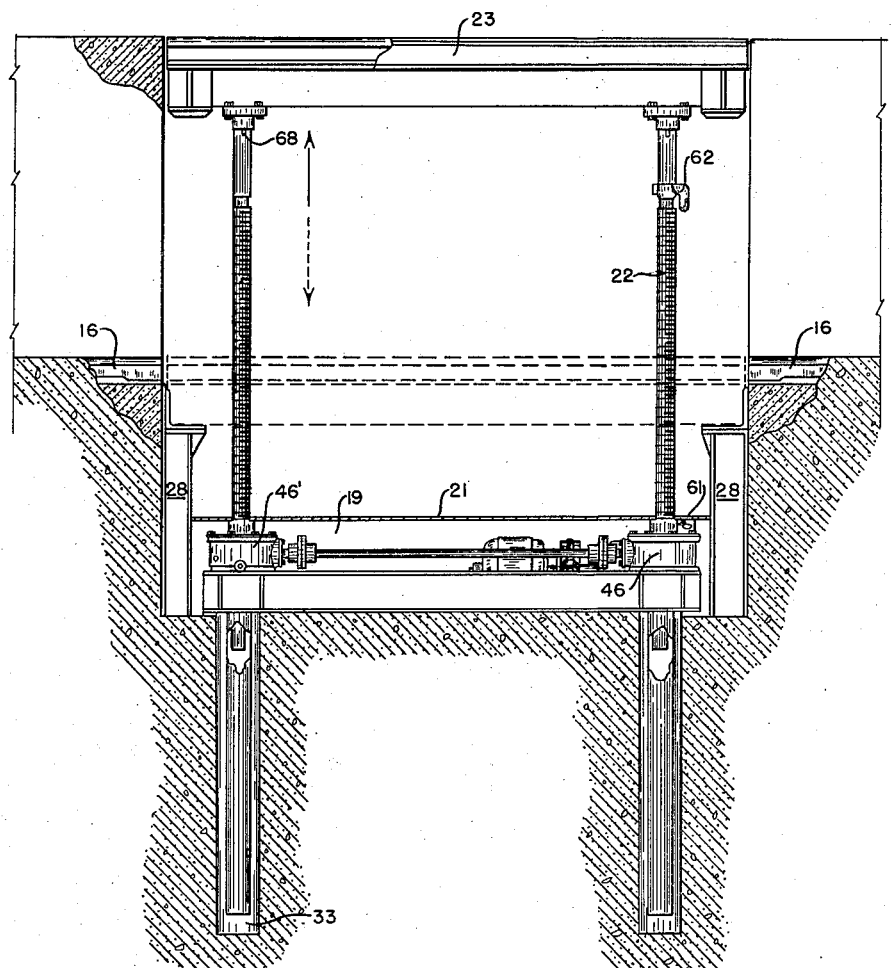
Fig. 6 is a partially broken away side elevation of my structure.

To house the operating mechanism for my bridge I provide a pit 19 of suitable configuration, such as that illustrated in Figs. 4 and 5, in the interruption 17, the pit being covered by a plate 21 supported at ground floor level. Four spaced support members 22 having heavy external threads engage the under side of a platform 23 near its corners, and extend downwardly through the plate 21 into relatively deep holes 33, the latter extending downwardly beyond the floor of the pit 19. The members 22 support the bridge 18 when it is in raised position at deck level, and also serve to raise and lower the platform 23 at a predetermined speed, but do not contribute materially to the support of the platform 23 when the latter is in lowered position.

The platform 23 may, as indicated in Fig. 1, be of somewhat greater width than the bay 13, the decks 10 being cut away immediately above the bridge as necessary to permit registry between the upper surface of the platform 23 and the decks 10. Although many types of structure may be employed, the platform may suitably be formed by properly connecting a plurality of I-beams 24 to receive rail sections 26, which are spaced and disposed for registry with the railway track 16 when the platform 23 is in lowered position. A floor 27 is also mounted on the I-beam 24 flush with the top of the rail sections 26 and is cut away as necessary to permit the passage of a railway vehicle along the rail sections.

Four supporting abutments 28, shown more clearly in Fig. 5, are firmly anchored to the ends of the piers 14 at the interruption 17, and are spaced downwardly from the rails 16 in position to support the platform 23 with the rail sections 26 in alignment with the track 16. Each of the abutments may include a T-shaped support 29 on the upper surface of which is mounted an angle member 31 positioned to receive and support the platform 23. Considerable care should be employed in fixing the position of these angle members 31, since they must engage the bottom and sides of the platform 23 smoothly and firmly to insure against displacement of the platform by a locomotive. If desired, sections of the I-beams 24 may be cut away or other suitable receivers provided on the platform 23 for engagement with the angle members 31 in such manner as to prevent transverse displacement of the bridge, although this is not ordinarily necessary.

Figure 9:
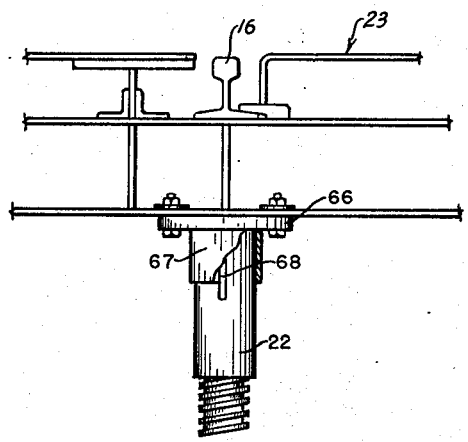
Fig. 9 is a partial elevation of a form of coupling device.

Since the platform 23 must rest on the abutments 28 when in lowered position, I prefer to provide a sliding reciprocating type of coupling between the support members 22 and the platform 23. For example, as shown in Fig. 9, I may secure to the under side of the platform 23 a flanged member 66 having a downwardly projecting hollow boss 67 supplied with internal splines 68 and disposed to receive the splined upper end of a support member 22. Thus, when the platform 23 is being raised, the upper end of the member 22 will extend through the boss 67 into contact with the underside of the platform 23, but as the platform 23 is lowered into engagement with the abutments 28, the support members 22 may be partially withdrawn and continue their downward movement without damage to the mechanism even after the platform has engaged the abutments.

Figure 10:
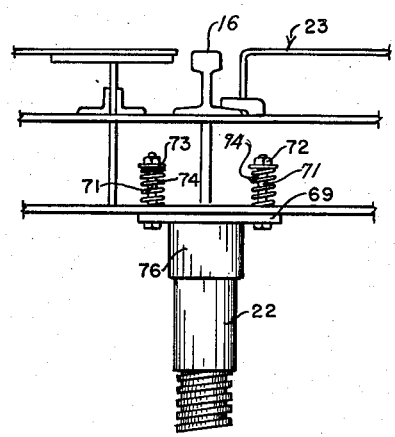
Fig. 10 is a partial elevation of another form of coupling device.

Fig. 10 illustrates a somewhat similar coupling, which includes a flange member 69 having studs 71 secured thereto and projecting upwardly through the lower web of the platform 23. The upper ends of the studs 71 are provided with nuts 72 and washers 73 to confine springs 74 between the washers 73 and the platform. The member 69 is provided with a downwardly projecting hollow boss 76, into which the upper end of the support member 22 extends, and to which it is secured as by welding. As the platform engages the abutments 28 in its downward movement, the motor may overrun, thus continuing the downward movement of the support members 22 after the platform has come to rest, without damage to the operating mechanism, since this movement merely compresses the springs 74.

The pit 19 is of suitable configuration to receive the operating mechanism illustrated in Fig. 10 which includes a reversible electric motor 34 having an output shaft 37 provided with a brake drum 30 upon which a suitable spring-actuated, solenoid-released brake 39 operates. The shaft 37 is coupled to a worm 35 rotatably supported in a worm gear box 38 and engages a worm gear 40. Laterally extending shafts 41 are driven by the worm gear 40 through couplings 42, and extend laterally into driving connection with pinions 43 rotatably supported by bearings 44 in gear boxes generally designated 46. A gear box 46 is required for each of the two support members 22 disposed laterally from the worm gear box 38.

Each of the gear boxes 46 includes a housing 47 through which the threaded support members 22 extend and are therefore disposed over the holes 33 in the pit 19. Formed integrally with the housing 47 is a hollow upwardly extending flange 48 counter-bored to receive a thrust bearing 49 which supports a nut 51 having internal threads engaging the support member 22. A ring gear 52 is secured as by screws 53 to the nut 51 and meshes with the pinion 43, the ring gear 52 being above the pinion. A cover 54 having a suitable aperture formed therein for the support member 22 is secured to the top of the housing 47 and incorporates a lubricant opening, ordinarily closed by a filler plug 56. A drain plug 57 is provided in the housing 47 to permit change of lubricant when necessary. Lubricant should be maintained in the housing at a level somewhat above the lower periphery of the pinion 43, since in operation the pinion 43 carries sufficient lubricant upwardly to thoroughly lubricate the moving parts within the housing 47.

The gear boxes 46 also include a second pinion 58 rotatably supported in the housing 47 and meshing with the ring gear 52. The pinions 58 drive shafts 59 which extend transversely to the shafts 41 and are coupled to pinions 60 disposed in gear boxes 46'. The gear boxes 46' are substantially identical to the gear boxes 46, but incorporate only a single pinion and serve to drive the two remaining support members 22.

It will be obvious that operation of the above-described mechanism will insure that the support members 22 are raised or lowered simultaneously at identical rates and that the platform 23 will therefore remain level during such operation. Care must be exercised, however, in selecting the proper pitch of thread for the support members 22 with respect to the angle of the threads on the worm and gear 35 and 40 respectively, since it is highly desirable to prevent the transmission of torque to the output shaft 37 from a weight disposed on the support members 22. Therefore, while it is not essential that either the threads on the support member or the worm gearing in the box 38 be fully irreversible, the combination of the two should give this effect, and thus provide an additional safety precaution insuring against unintentional movement of the platform 23 by reverse stress.

Mounted on one of the gear boxes 47 is a limit switch 61, which functions to disconnect the motor 34 from a suitable source of power when actuated by a plunger 62 adjustably secured to one of the support members 22. A second or upper limit switch 63 may be mounted on the under side of one of the decks 10 and disposed to engage a suitably disposed cam surface 64 on the platform 23 for limiting upward movement of the platform. It will be understood of course that suitable provision may be made for adjustment of either the position of the switch or the position of the cam 64.

To describe the operation of my device, it may be assumed that the platform 23 is in raised position at deck level, as shown in Fig. 1, and that it is desired to permit the passage of a diesel locomotive 32 along the railway track 16. A suitable switch (not shown) is connected to the motor and is actuated by a workman to energize the motor 34, which in turn drives the output shaft 37 and the nuts 51 in the gear boxes 46—46', thus drawing the support members 22 downwardly. As the motor is energized, the brake 39 is released by its solenoid, connected in series with the motor, thus permitting operation. Shortly before the platform 23 contacts the abutments 28, the plunger 62 engages the limit switch 61 and disconnects the motor 34 from its source of power, but the inertia of the device is sufficient to bring the platform 23 downwardly into secure engagement with the angle members 31 on the abutment 28. As the platform 23 is stopped by the abutments 28, the motor 34 may continue to rotate without stressing the gearing to any appreciable degree, due to the action of the couplings illustrated in Figs. 9 and 10. These also insure that the platform 23 will be firmly seated before the locomotive 32 is allowed to pass. Since the platform is firmly engaged by the angle members 31 on the abutments 28, which are in turn rigid with the piers 14, it is obvious that the support members 22 are not required to carry the weight of the locomotive 32; and furthermore, since the angle members 31 support the platform against lateral movement, that rail sections 26 will not only align with the track 16, but can not be displaced by the tractive effort of the locomotive.

When the lomocotive 32 has passed, the workman may again actuate the switch to raise the bridge 18. This causes the motor 34 to revolve in a reverse direction and force the support members 22 upwardly until the cam 64 engages the upper limit switch 63. The switch 63 disconnects the motor and at the same time applies the brake 39 by deenergizing the brake solenoid, thus bringing the platform 23 to a stop with the floor 27 at deck level. In this position the platform 23 bridges the bay 13 and permits the passage of men and materials between the decks 10, while the plate 31 bridges the pit 19 at ground level and allows the passage of men and materials across the tracks between the support members 22.

The bridge will not move from raised position under heavy load even if the brake 39 becomes inoperative, since the torque, generated by the load, can not be transmitted through the irreversible gearing system.

Under ordinary circumstances I prefer to employ the type of structure hereinbefore described, which incorporates four threaded support members; but there are instances wherein this type of structure is not desirable. For example, it is occasionally necessary to employ my bridge structure in locations where the ground water level is only a short distance below the main floor level; and as a result, water will gradually seep into the holes 33 in which the support members 22 move. In such instances I may provide a device of the type illustrated in Figs. 12-15. In this modified form of my invention, I employ cables secured to the four corners of the platform 23 to raise and lower the platform. For this purpose four heavy support members 77 are mounted on the deck 10 and provided at their upper ends with sheaves 78, over which cables 79 are trained. The support members 77 are preferably hollow, thus enclosing the cable 79, which is secured at one end to a corner of the platform 23 by a suitable bracket 81. From the bracket 81, the cable extends upwardly through the support members 77, over the sheaves 78, and downwardly within the support member 77, to sheaves 82 mounted within a shallow pit 83 formed below the level of the main floor 12. A reversible electric motor 84, a solenoid brake 86, and a worm gear box 87 similar to the motor 34, brake 39, and worm gear box 38, previously described, are mounted in the pit 83 below a cover plate 88 disposed at floor level. Laterally extending shafts 89 extend from the gear box 87 and drive cable drums 91 rotatably supported in bearings 92.

If desired, separate cables may be used for each of the four corners of the platform 23, or the opposite ends of a single cable may be secured to opposite corners of the platform 23; but in either event, the cable 79 is led over and around the drums 91 in such manner that the motor 84 is driven in one direction and cable 79 will be wound around the drums 91. Limit switches similar to those previously described may be provided to control operation of the motor 84.

Figure 16:
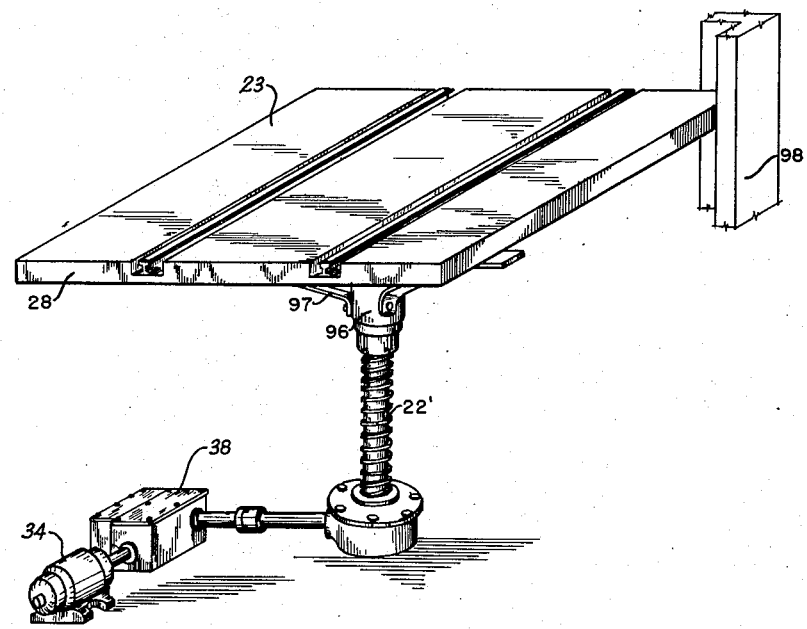
Fig. 16 is a partial perspective illustrating another modified form of my bridge.
Figure 12:
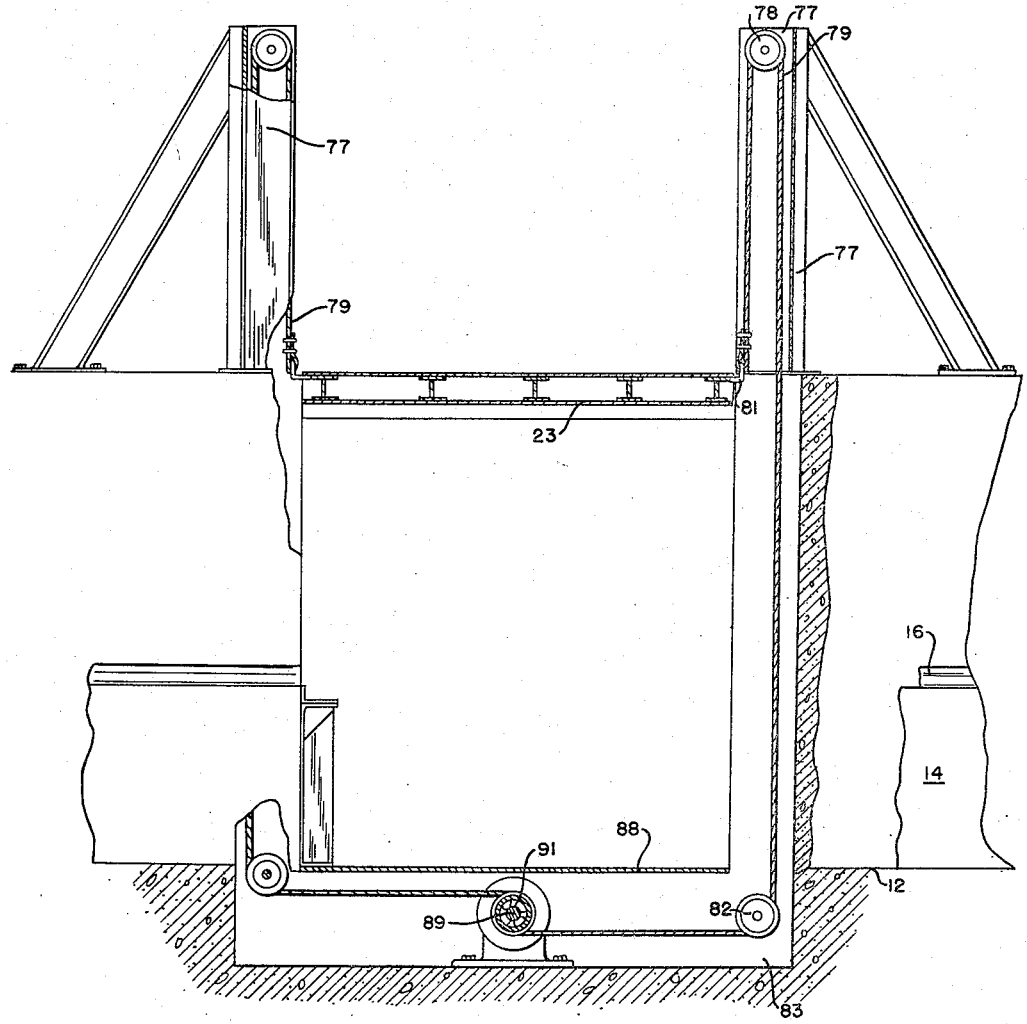
Fig. 12 is a partially sectional partial elevation of a modified form of my invention.
Figure 13:
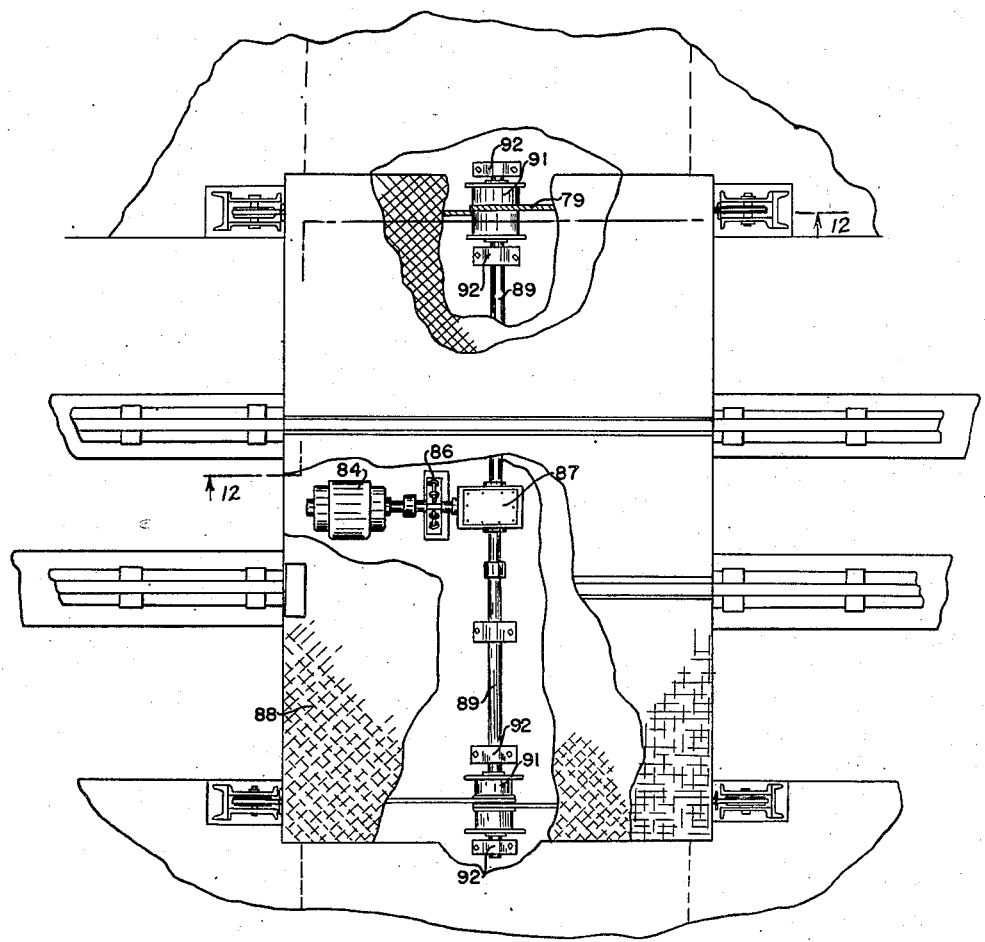
Fig. 13 is a partial plan view of the device shown in Fig. 12 with a portion of the cover plate broken away to show the operating mechanism.
Figure 14:
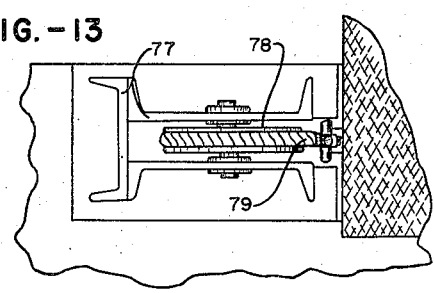
Fig. 14 is a plan view of one of the supports shown in Figs. 12 and 13.

A further modification of my bridge is illustrated in my Fig. 16, which represents somewhat diagrammatically a platform 23 adapted to be raised and lowered by a single support member 22'. The apparatus for driving the support member 22' may be somewhat similar to that previously described in connection with Figs. 1-11, inclusive. The upper end of the support member 22', however, is splined and engages a heavy collar 96 secured to the under side of the platform 23 at its midpoint. Laterally extending reinforcing members 97 project outwardly and upwardly from the collar 96 and are secured at their outer ends to the underside of the platform 23. The corners of the platform 23 should in this instance move vertically in angular uprights 98, which engage the corners of the platform 23 and prevent rotation. If desired, the members 98 may be substituted for the pillars 11 immediately adjacent the corners of the platform 23, and serve to contribute to the decks 10.

From the foregoing it may be seen that my bridge eliminates the danger and difficulty involved in the use of hand-operated portable bridges such as are sometimes put into and out of position across the bays, since it not only eliminates the need for handling a cumbersome weight, but is positive in its action and amply strong to support the necessary weight. Considerable time is also saved, particularly since my bridge may be operated rapidly and without danger to the operating mechanism and a passageway at ground floor level provided. Access to the mechanism for maintenance and repair is simplified, since removal of the plate of the cover 21 from the pit 19 exposes all of the mechanism.

It should be understood that the foregoing detail description has been made solely for the purposes of illustration and is not to be interpreted as limiting the scope of my invention. I do not bind myself to the details herein described except insofar as defined in the appended claims.

I claim:

1. A crossover bridge having associated therewith a railway track supported on piers above floor level with an interruption therein including a pit having a bottom below floor level and elevated decks above track level defining a track bay into which a railway vehicle may be moved, comprising a platform having flush-mounted rail sections thereon for alignment with the railway tracks when in lowered position, thereby bridging the interruption in the tracks to permit passage of the railway vehicle and adapted to be raised to deck level for spanning the bay, a bridge member spanning the pit at floor level, a plurality of spaced generally vertical support members fixed to the platform and adapted for raising and lowering therewith, reversible power-operated mechanism for raising and lowering the support members, and stationary means for supporting the platform when in lowered position.

2. A crossover bridge having associated therewith a railway track supported on piers above floor level and having an interruption therein, a pit extending below floor level in the interruption and decks above track level defining track bays into which a railway vehicle may be moved, comprising a rectangular platform over the pit having flush-mounted rail sections thereon for alignment with the railway track when in lowered position, the width of the platform being sufficient to span the bay when in raised position, a bridge member at substantially floor level spanning the pit, a plurality of vertically movable support members engaging the platform and extending through the bridge member, power-operated mechanism in the pit for raising the platform to deck level and for lowering the platform to track level, and stationary means for positively limiting downward movement of the platform.

3. A crossover bridge having associated therewith a railway track supported on piers above floor level and having an interruption therein, a pit extending below floor level in the interruption and decks above track level defining track bays into which a railway vehicle may be moved comprising a rectangular platform over the pit having flush-mounted rail sections thereon for alignment with the railway track when in lowered position, the width of the platform being sufficient to span the bay when in raised position, a cover at substantially ground floor level for the pit, threaded members fixed to the under side of the platform and extending through the pit cover into the pit, rotatable nuts supported in the pit for raising and lowering the threaded members, reversible electric power means in the pit for simultaneously rotating said nuts and thereby raising the platform to deck level and lowering the platform to track level, and a stationary support in the path of the platform for positively limiting the extent of vertical movement of the platform in one direction.

4. A crossover bridge having associated therewith a railway track supported on piers above floor level and having an interruption therein, a pit extending below floor level in the interruption, and decks above track level defining track bays into which a railway vehicle may be moved, comprising a rectangular platform over the pit having flush-mounted rail sections thereon for alignment with the railway track when in lowered position, the width of the platform being sufficient to span the bay when in raised position, a cover at substantially ground floor level for the pit, threaded support members secured to the under side of the platform near the corners thereof and extending into the pit, said supports defining a passageway across the tracks at the interruption at ground level when the platform is raised to deck level, rotatable nuts supported in the pit and engaging the threaded supports, a reversible motor in the pit, and a worm and gear interconnecting the motor and said nuts.

5. A crossover bridge having associated therewith a railway track supported on piers above floor level and having an interruption therein, a pit extending below floor level in the interruption and decks above track level defining track bays into which a railway vehicle may be moved, comprising a rectangular platform over the pit having flush-mounted rail sections thereon for alignment with the railway track when in lowered position, the width of the platform being sufficient to span the bay when in raised position, a cover at substantially ground floor for the pit, threaded support members secured to the under side of the platform near the corners thereof and extending into the pit, said supports defining a passageway across the tracks at the interruption at ground level when the platform is raised to deck level, rotatable nuts supported in the pit and engaging the threaded supports, a reversible motor in the pit, a worm and gear interconnecting the motor and said nuts, limit switch means connected with the motor for limiting upward movement of the platform, and abutments fixed to the track piers and projecting into the interruption for engaging the under side of the platform when the platform is in lowered position.

6. A crossover bridge having associated therewith a railway track supported on piers above floor level and having an interruption therein, a pit extending below floor level in the interruption and decks above track level defining track bays into which a railway vehicle may be moved, comprising a rectangular platform over the pit having flush-mounted rail sections thereon for alignment with the railway track when in lowered position, the width of the platform being sufficient to span the bay when in raised position, a cover at substantially ground floor level for the pit, threaded support members secured to the under side of the platform near the corners thereof and extending into the pit, said supports defining a passageway across the tracks at the interruption at ground level when the platform is raised to deck level, rotatable nuts supported in the pit and engaging the threaded supports, a reversible motor in the pit, a worm and gear interconnecting the motor and said nuts, and members fixed to the track piers and projecting into the interruption, said members being so disposed and arranged as to engage the sides and bottom of the platform when in lowered position whereby vertical and lateral displacement of the platform is prevented.

7. A crossover bridge having associated therewith a railway track supported on piers above floor level and having an interruption therein, a pit extending below floor level in the interruption, and decks above track level defining track bays into which a railway vehicle may be moved, comprising a rectangular platform over the pit having flush-mounted rail sections thereon for alignment with the railway track when in lowered position, the width of the platform being sufficient to span the bay when in raised position, a cover at substantially ground floor level for the pit, threaded support members secured to the under side of the platform near the corners thereof and extending into the pit, said supports defining a passageway across the tracks at the interruption at ground level when the platform is raised to deck level, rotatable nuts supported in the pit and engaging the threaded supports, a reversible motor in the pit, a worm and gear interconnecting the motor and said nuts, stationary means for limiting vertical movement of the platform in one direction, said nuts and worm and gear constituting a system incapable of transmitting torque from the support members.

8. A crossover bridge having associated therewith a railway track supported on piers above floor level and having an interruption therein, a pit extending below floor level in the interruption and decks above track level defining track bays into which a railway vehicle may be moved and comprising a platform over the pit having flush-mounted rail sections thereon for alignment with the railway track when in lowered position, the width of the platform being sufficient to span the bay when in raised position, a bridge member at substantially ground floor level covering the pit, a plurality of vertically movable support members engaging the platform and extending through the bridge member, reversible power-operated mechanism in the pit for raising the platform to deck level and for lowering the platform to track level, and means movable with the platform for terminating operation of the power-operated mechanism when the platform reaches a predetermined position.

9. A crossover bridge having associated therewith a building structure including a railway track supported above a floor and having an interruption therein including a pit having a bottom below floor level and elevated decks supported above track level defining a track bay into which a railway vehicle may be moved along the track comprising a bridge member spanning the pit at floor level, a platform above said bridge member having flush mounted rail sections thereon for alignment with the railway tracks when the platform is in lowered position thereby bridging the interruption in the tracks to permit passage of the railway vehicle and adapted to be raised to deck level for spanning the bay and permitting communication between the decks, a plurality of spaced, generally vertical support members engaging the platform and adapted for vertical movement therewith, power-operated mechanism for raising and lowering the support members, and rigid means disposed in the path of the platform and adapted to engage the building structure and the platform when said platform reaches a predetermined position.

10. A crossover bridge having associated therewith a railway track supported above a floor with an interruption in the track including a pit having a bottom below floor level and elevated decks above the floor and track defining a track bay into which a railway vehicle may be moved comprising a bridge member spanning the pit, a rigid platform above the bridge member having flush-mounted rail sections thereon for alignment with the railway track when the platform is in lowered position thereby permitting passage of a railway vehicle, means including a vertical support member coupled to the platform and an electric motor coupled to the support member for raising the platform vertically to elevated position spanning the bay and a rigid member permanently disposed in the path of the platform for positively limiting downward movement of the platform.

11. A crossover bridge structure having associated therewith a railway track supported above floor level with an interruption therein permitting passage along floor level through the interruption and elevated decks above track level defining track bays into which a railway vehicle may be moved along said tracks and comprising a bridge member spanning the interruption at floor level, a platform above the bridge member movable vertically in and above the interruption and having flush-mounted rail sections thereon for alignment with the railway track when the platform is in lowered position, a plurality of vertically movable support members secured to the platform, and motor means coupled to the support members for moving the platform vertically, said platform in raised position being adapted to span the bay permitting communication between the decks and along the floor through the interruption and in lowered position to span the interruption in the track for permitting passage of a railway vehicle along said track and rail sections.

12. A crossover bridge having associated therewith a railway track supported above floor level and having an interruption formed therein, a pit extending below floor level in the interruption and decks above the track level defining track bays into which a railway vehicle may be moved comprising a platform over the pit having flush-mounted rail sections for alignment with the railway track when in lowered position, the width of the platform being sufficient to span the bay when the platform is in raised position, a cover at substantially ground floor level for the pit, an upright support member engaging the platform and extending through the pit cover, reversible power-operated mechanism in the pit for raising the upright member and platform to deck level and for lowering the platform to track level, and stationary means for positively limiting downward movement of the platform.

13. A crossover bridge having associated therewith a building structure including a railway track supported above a floor and having an interruption formed in said track, a pit extending below floor level in the interruption and decks above track level defining track bays into which a railway vehicle may be moved comprising a platform over the pit having flush-mounted rail sections thereon for alignment with the railway track when in lowered position, the width of the platform being sufficient to span the bay when the platform is in raised position, a cover at substantially floor level for the pit, a reversible power-driven cable drum, a plurality of fixed rotatable sheaves, cable means secured to the platform and the cable drum and extending over the sheaves for raising the platform to deck level and for lowering the platform to track level, and a stationary member fixed with respect to the building structure and in the path of the platform for limiting downward movement of the platform.

14. Apparatus for use with a structure having a floor and decks supported above the floor, said decks defining a bay, piers in the bay defining an interruption and rails on the piers, comprising a bridge member at floor level extending across the interruption, a platform in the interruption above the bridge member having flush mounted rail sections thereon for alignment with rails on the piers when in lowered position, stationary means above the floor level supporting the platform when in lowered position, and means for moving the platform vertically to a raised position at deck level, the width of said platform being sufficient to span the bay.

ASA W. SKINNER.

References Cited in the file of this patent

UNITED STATES PATENTS

| Number | Name | Date |
|---|---|---|
| 342,757 | Morrison | May 25, 1886 |
| 613,851 | Bryan | Nov. 8, 1898 |
| 1,058,251 | Moller | Apr. 8, 1913 |
| 1,432,997 | Graham | Oct. 24, 1922 |
| 1,740,937 | Zoller et al. | Dec. 24, 1929 |

OTHER REFERENCES

"Locomotive Cyclopedia," 13th edition, 1947, page 1155.